June 2, 1970  R. W. BARTNIK  3,515,265
UNIT DISPENSER WITH VISUAL INVENTORY CONTROL
Filed May 28, 1968
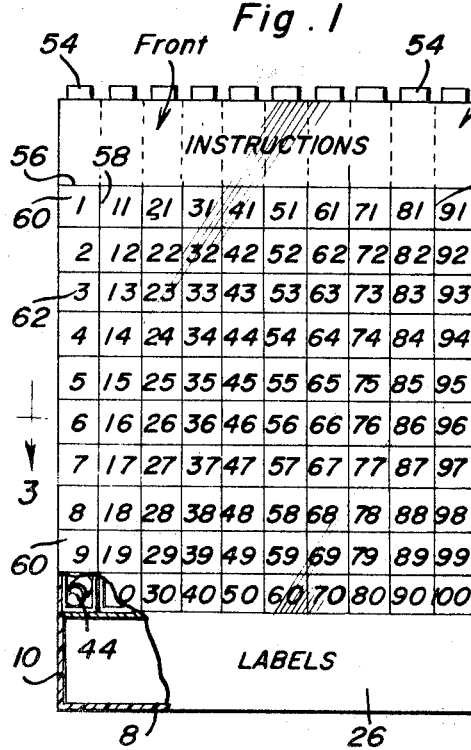
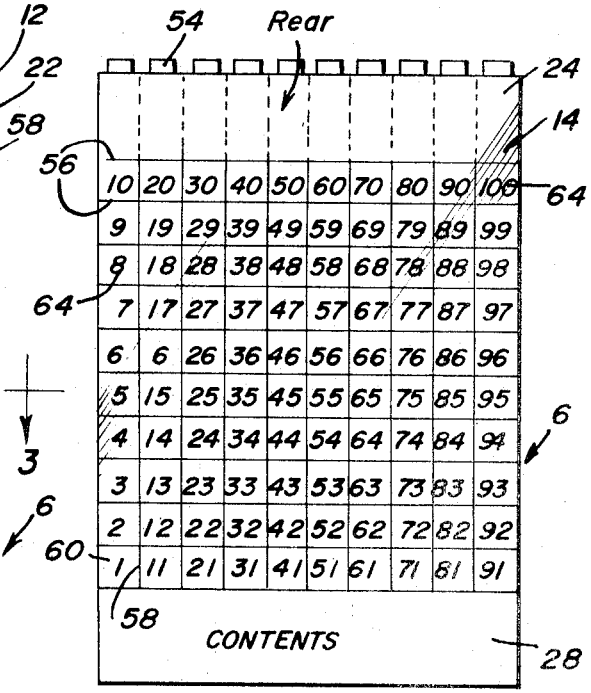
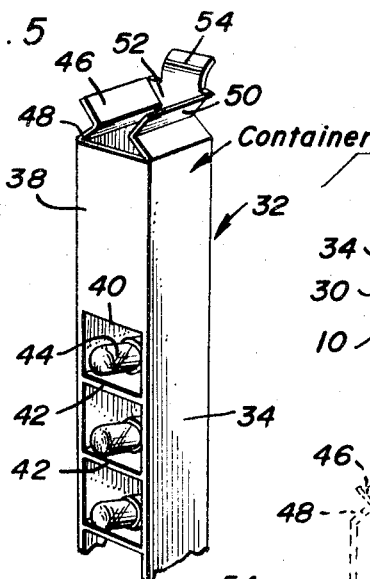
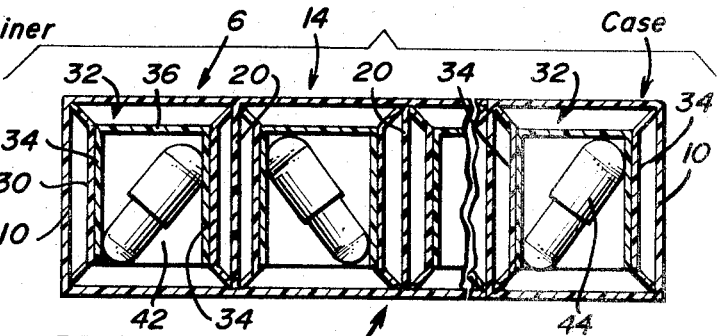
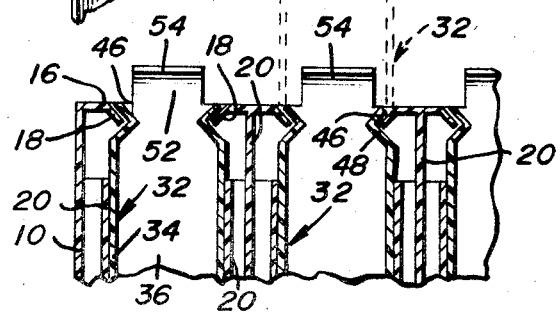
Richard W. Bartnik
INVENTOR.
BY Clarence A. O'Brien
and Harvey B. Jacobson
Attorneys

United States Patent Office 3,515,265
Patented June 2, 1970

3,515,265
UNIT DISPENSER WITH VISUAL INVENTORY CONTROL
Richard W. Bartnik, West Frankfort, Ill.
(3720 S. Franklin St., Michigan City, Ind. 46360)
Filed May 28, 1968, Ser. No. 732,651
Int. Cl. B65d 83/04
U.S. Cl. 206—42     7 Claims

ABSTRACT OF THE DISCLOSURE

A factory filled package-type unit for systematized positive inventoried visual control and authorized handling and dispensing of pills, capsules, ampules, vials and the like. A rectangular box-like plastic shell is transformed by partitions into a compartmented case. The battery of compartments serve to protectively enclose a plurality of progressively usable withdrawable transparent tray-like containers. These containers have partitioned pockets for individual pills and the like. The front and back walls of the case are systematically lined and plotted to provide columnized reference numbers, the latter being arranged in numerical order (1 to 100 on the front and 100 to 1 on the rear) to provide quick reference charts through the medium of which a nurse or authorized person can keep tab on the items already used and remaining items for subsequent and controlled use.

---

This invention relates to certain new and useful improvements in a unique self-contained packaging, storing, and dispensing device which lends itself to hospital and clinic use in drug room cabinets, refrigerators and storage areas such as are currently being used and has to do with an innovation which is suitable for more positive visual control and handling of regulable medications by nurses and authorized persons.

One of the most difficult and perplexing tasks in the field of endeavor under advisement is the physical inventory of drugs, medicaments and the like which are isolated and kept in refrigerators, cabinets and prescribed drug room storage areas. Conventional glass, plastic bottles and containers predominantly used for storage of regulable drugs requires, when inventory is taken, that items in the bottles be emptied from the same and either counted by hand or alternatively with the use and aid of counting devices which are tabulated for inventory requirements of the balance on hand. This prevailing practice is customarily performed three times a day for narcotics, barbiturates and aphetamines. When nursing service changes shift daily (normally at 7:00 a.m., 3:00 p.m. and 11:00 p.m.) one can appreciate the general nature of the problem involved and the herein disclosed solution of the same whether inventory requirements are daily, weekly, monthly or otherwise. This is to say the present invention has been evolved and produced with the thought in mind of eliminating the tedious part of drug inventory taking not only for pills but capsules, ampules, vials and the like. Generally stated, it has to do with visual tabulation of the unused portion of the contents of the device remaining in special drawer-like slides, trays or structurally equivalent insertable and removable containers.

Briefly, the invention is characterized by a factory filled ready-to-use storing and dispensing package expressly designed and adapted for inventoried preservation and dispensing, systematically of course, of pills, capsules, ampules, vials and the like. The prescribed package embodies a main component part, more explicitly, a portable manually usable case. This case has at least one elongated open-ended compartment, that is in a simple aspect of the concept. The applicable and removable insert comprises a tray-like article container and dispenser. This component is fitted telescopically into and slidingly encased within the confines of the compartment in which it is housed. It has an outer or outward end which can be caught hold of in a manner that the container can then be withdrawn to the desired extent to permit access to be had to the receptacle portion thereof. In fact, the receptacle portion of the container is preferably provided with dividers or partitions which define separate pockets for retention of the aforementioned pills and other items. At least one wall of the compartment, preferably both front and back walls, is transparent and has predetermined numerical indicia which is charted and systematically arranged so that the columns of numbers register and coordinate with the pockets in the container in a manner to provide visual inspection and to facilitate checking and controlling of the contents of the pockets, that is, singly and collectively. It follows that the experienced nurse or other authorized user can provide a positive manner of visual inventoried storage and control of the packaged or stored items.

Stated somewhat more specifically, the case is preferably one of general rectangular flat-faced form having front and back walls and bototm and end walls. The top wall is apertured to provide inlet and outlet openings for the telescoping tray-like pill containers. The withdrawable or upper end (in the views of the drawing) are nested in flanged openings. Also the containers are slidable in tracks provided therefor in each cell or compartment. The front and back exterior walls are inscribed with horizontal and vertical lines defining charts. The charts are made up of columnized rows of numbers which are arranged in proper sequential or numerical order and are lined up with the pockets in the containers to enable the user to achieve the improved end results desired.

As will be hereinafter more fully understood the invention herein disclosed not only well serves the purposes for which it is intended but provides the desired effectual visual control which is herein established for dispensing of medications and other products that would be suitable for use in the device herein shown and described. The size of the plastic container can be varied to accommodate products requiring rapid checking and inventory needs. In particular the back or reverse side or wall of the plastic case numerically shows unused balance of products or items in the containers in the case. Rapid dispensing and inventory control can be assured for storage handling and dispensing of narcotics, barbiturates, aphetamines, ampules, vials and the like. Then, too, the invention lends itself adaptable for handling and storage of products requiring refrigeration and, in addition, the plastic material used lends itself to practical use for light control if required by the item or product in storage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in front elevation showing the packaging device with certain descriptive legends thereon and with the lower left hand corner broken away and appearing in section to facilitate an understanding of the construction and use of the invention.

FIG. 2 is a view of the reverse or rear side with the columnized rows of consecutive numbers properly reversed by comparison with those appearing in FIG. 1.

FIG. 3 is a horizontal section on an enlarged scale and fragmentarily shown, and taken approximately on the plane of the horizontal section line 3—3 of FIG. 1.

FIG. 4 is a fragmentary view with the upper left hand corner portion of the device appearing and which shows, in phantom lines, how one of the slide-away or tray-like containers can be lifted and withdrawn (either in a vertical plane or horizontal plane) for dispensing use, and FIG. 5 is a fragmentary perspective view of one of the insertable and removable pill or article containers and which brings out the upper end construction of the same.

Referring now to the views of the drawings with the aid of like reference numerals it will be seen that the aforementioned prefabricated factory-filled package is characterized, generally stated, by a plastic rectangular shell which is here referred to as a compartmented case and is designated by the numeral 6. This case may be of appropriate dimensions and is preferably of plastic material which may be either clear or colored but nevertheless amply transparent to permit the inventory requirements to be expeditiously handled. The case shown lends itself to use in the aforementioned drug room storage areas. It is preferably but not necessarily rectangular in form and as shown in FIG. 1 comprises a flat bottom wall 8, vertical end walls 10, a flat front wall 12 and a flat substantially similar back wall 14. The top wall is denoted at 16 in FIG. 4. All walls but the top wall are imperforate. The top wall is provided with a plurality of apertures or openings each of which is provided at the ends thereof with inwardly and downwardly angled limit stop flanges. These flanges are denoted at 18 in FIG. 4. The hollow space of the case is provided with a plurality of integral partitions or dividers 20 which serve to divide the space into a plurality of elongate compartments. Each compartment and container therein is the same in construction. A description of one will suffice for all. It will be noted that the upper portions 22 and 24 (FIGS. 1 and 2 respectively) are imperforate and in practice will contain suitable legends for instructions. The lower imperforate portion in FIG. 1 is denoted at 26 and can be used for labeling needs. The corresponding lower portion 28 on the back can be used for identification of contents requirements.

It will be noted particularly in FIG. 3 that the interior of each compartment is provided with spaced parallel guide tracks and these are denoted at 30 and are in spaced apart parallelism to accommodate the insertable and removable multiple article container which is here denoted as an entity by the numeral 32. Not only are the walls of the outside case made of plastic material, the walls of the tray-like container 32 are also of plastic material. The sidewalls of the container are denoted at 34 in FIG. 5, the back wall at 36, and the front wall at 38. The front wall is primarily open as at 40 and the hollow portion of the container is provided with dividers or partitions as at 42 which define pockets for the individual pills or other items 44. In the illustration shown the so-called pills are in the form of capsules. It has been decided to show all of the pockets in the plurality of containers adapted to contain capsules since in packaging the device at the factory it will be loaded to contain, let us say, 100 duplicate capsules which are identical for systematic and prescribed use. The outer or upper end portion of each container is provided with a pair of diametrically opposite V-shaped nesting retainers. Each retainer embodies divergent flanges 46 and 48 with a crease or fold 50 therebetween. These flanged members provide detents which are nested in the aforementioned openings in the top wall with the flanges co-operating with the aforementioned limit stop flanges 18. There is an additional connecting flange at 52 (FIG. 5) which is provided with a pull tab 54.

The aforementioned front and rear walls 12 and 14 are provided with delineated charts. Each chart comprises horizontal lines as at 56 (FIGS. 1 and 2) and vertical intersecting lines 58. These lines are arranged to provide square spaces as at 60 and these spaces are in row alignment as shown in both FIGS. 1 and 2. Each space contains an identifying number. The numbers in the first column at the left in FIG. 1 range from 1 to 10 inclusive and these numbers are lined up with the aforementioned pill containing pockets in the insertable and removable container 32. The columnized numbers in FIG. 1 range in numerical order from 1 at the left to 100 in the lower right hand corner. By turning the device over from left to right in FIG. 2 it will be seen that the numbers which are here conveniently referred to at 64 are in reverse order and range from 100 to 1 that is from right to left in FIG. 2.

By use of a rectangular shaped storage case, clear or colored, having on the front portion suitably inscribed or etched numbers in columnized rows, it will be seen that the user, ordinarily a nurse or other authorized person, can achieve the end results desired with expediency and certainty. By pulling upward on a selected pull tab located at the upper part of the container items in the pockets can be dispensed and in turn pushed back down in the storage container or case for subsequent use or taking of inventory. This invention accordingly provides a positive method of visual control in dispensing and inventory control for medications and other items adaptable to the structure shown. Inventory is obtained by looking at the reverse side of the case and visually shaking the unused number of items in the container which is of course the balance on hand for inventory purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use by authorized persons in hospital drug room storage areas, a factory filled ready-to-use storing and dispensing package for inventoried preservation and systematic dispensing of individual pills, capsules, ampules, vials and medications comprising: a portable manually usable case having at least one elongate open ended compartment, and a tray-like article container and dispenser telescoping into and slidingly encased within the confines of said compartment and having an outward end which can be caught hold of and said container withdrawn to permit access to be had to the receptacle portion of said container, said receptacle portion having separate pockets for retention of individual pills or the like, at least one wall of said compartment being transparent and having predetermined indicia which is oriented to register and coordinate with said pockets in a manner to provide visual inspection, checking and control of the contents of said pockets singly and collectively, whereby to provide a positive manner of visual inventoried control, said compartment having transparent front and back walls each of which has a column of numbers inscribed thereon in requisite sequential order.

2. The storing and dispensing package defined in and according to claim 1, and wherein said compartment is non-circular in cross-section, opposed interior wall surfaces of said compartment having spaced parallel guide tracks, said container having cooperating sidewalls which are shiftably slidable between said guide tracks, said container being commensurate in length with the length of said compartment.

3. The storing and dispensing package defined in and according to claim 2, and wherein said outward end of said container is provided with an outstanding constantly accessible finger actuated pull tab, and wherein the open end of said compartment constitutes the outer end thereof and is provided with limit stop flanges, and also wherein the companion outer end of said container is provided with detents which normally abut said limit stop flanges when the container is fully and protectively encased in said compartment.

4. Packaging means designed and adapted for visual control in the practice of inventoried dispensing of pills, capsules, ampules, vials and the like small items comprising a portable manually usable unit made of moldable plastic material and embodying bottom, top, end, and front and back walls cooperatively joined and providing a hollow box-like case, said front and back walls being transparent, the hollow interior portion of said case having spaced parallel partitions dividing said hollow portion into individual compartments, said top wall having spaced openings alined with their respectively cooperable compartments, the exterior surface portions of said front and back walls having columnized rows of consecutive numbers, the respective rows being aligned with their respectively cooperable compartments, and a tray-like container normally and protectively encased within the encompassing confines of each companion compartment and having an outward end capable of being caught hold of so that said container can be withdrawn to the extent desired to permit access to be had to the receptacle portion and the contents removably stored therein, said receptacle portion having longitudinally spaced partitions defining individual pockets for individual pills or the like, the numbers in the aforementioned rows being located in distinguishable plotting squares and said squares being registered with predetermined ones of the individual pill storing pockets.

5. The control and dispensing package defined in and according to claim 4 and wherein each top opening is provided with a pair of laterally directed limit stop flanges, the complemental outer end of the coacting container having a pull tab and being being provided with V-shaped flanged portions which are cooperable with said limit stop flanges and constitute detents.

6. The control and dispensing package defined in and according to claim 5, and wherein each compartment is non-circular in cross-section and has opposed parallel walls which are interiorly provided with longitudinally extending guide tracks, the complemental container being slidingly mounted between coacting guide tracks, said container being made of transparent plastic material.

7. The control and dispensing package defined in and according to claim 6, and wherein the columnized numbers on the front provide a first quick-reference chart with the numbers arranged from 1 to 100 and the columnized numbers on the back provide a second quick-reference chart whose numbers range in reverse order from 100 to 1 and permit the user to check and double check the number of emptied containers and the number of pills still on hand for contemplated use according to plan.

References Cited

UNITED STATES PATENTS

| | | | |
|---|---|---|---|
| 1,980,819 | 11/1934 | Nelson | 206—44.12 |
| 1,991,425 | 2/1935 | Sherman | 229—9 |
| 3,225,913 | 12/1965 | Lee | 206—42 |
| 3,262,747 | 7/1966 | Kotzek et al. | 206—42 |
| 3,324,995 | 6/1967 | Sharp | 206—42 |
| 3,393,794 | 7/1968 | Borin | 206—42 |

FOREIGN PATENTS

| | | |
|---|---|---|
| 330,152 | 6/1903 | France. |
| 1,012,508 | 12/1965 | Great Britain. |

WILLIAM T. DIXSON, JR., Primary Examiner

U.S. Cl. X.R.

116—121; 312—42